(12) United States Patent
Hunter et al.

(10) Patent No.: US 11,192,074 B2
(45) Date of Patent: Dec. 7, 2021

(54) MULLING DEVICE AND METHOD FOR TREATING BULK MATERIAL RELEASED FROM PORTABLE CONTAINERS

(71) Applicant: Halliburton Energy Services, Inc., Houston, TX (US)

(72) Inventors: Timothy Holiman Hunter, Duncan, OK (US); Bryan John Lewis, Duncan, OK (US); Jim Basuki Surjaatmadja, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 315 days.

(21) Appl. No.: 16/063,931

(22) PCT Filed: Mar. 15, 2016

(86) PCT No.: PCT/US2016/022489
§ 371 (c)(1),
(2) Date: Jun. 19, 2018

(87) PCT Pub. No.: WO2017/160283
PCT Pub. Date: Sep. 21, 2017

(65) Prior Publication Data
US 2018/0369762 A1    Dec. 27, 2018

(51) Int. Cl.
*B01F 3/18* (2006.01)
*B01F 7/08* (2006.01)
(Continued)

(52) U.S. Cl.
CPC ............... *B01F 3/184* (2013.01); *B01F 3/18* (2013.01); *B01F 3/188* (2013.01); *B01F 7/085* (2013.01);
(Continued)

(58) Field of Classification Search
CPC ..... B01F 13/004; B01F 15/00136; B01F 3/18; B01F 3/184; B01F 3/188; B01F 7/085;
(Continued)

(56) References Cited

U.S. PATENT DOCUMENTS 710,611 A    10/1902   Ray
917,646 A     4/1909   Otto
(Continued)

FOREIGN PATENT DOCUMENTS

EP    2937826 A1    10/2015
GB    2066220 A      7/1981
(Continued)

OTHER PUBLICATIONS

International Preliminary Report on Patentability issued in related PCT Application No. PCT/US2016/022489 dated Sep. 27, 2018, 9 pages.
(Continued)

*Primary Examiner* — Tony G Soohoo
(74) *Attorney, Agent, or Firm* — John Wustenberg; Baker Botts L.L.P.

(57) ABSTRACT

In accordance with presently disclosed embodiments, systems and methods for efficiently managing bulk material are provided. The disclosure is directed to systems and methods for efficiently combining additives into bulk material being transferred about a job site. The systems may include a support structure used to receive one or more portable containers of bulk material, and a mulling device disposed beneath the support structure to provide bulk material treatment capabilities. Specifically, the mulling device may facilitate mixing of coatings or other additives with bulk material that is released from the portable containers, as well as transfer of the mixture to an outlet location.

20 Claims, 5 Drawing Sheets

(51) Int. Cl.
  *B01F 13/00* (2006.01)
  *B65G 65/30* (2006.01)
  *B01F 15/02* (2006.01)
  *B62D 63/06* (2006.01)
  *B65G 47/19* (2006.01)
  *E21B 41/00* (2006.01)
  *E21B 21/06* (2006.01)
  *B01F 15/00* (2006.01)

(52) U.S. Cl.
  CPC ........ *B01F 13/004* (2013.01); *B01F 15/0235* (2013.01); *B01F 15/0243* (2013.01); *B65G 65/30* (2013.01); *B01F 15/00136* (2013.01); *B01F 2215/0081* (2013.01); *B62D 63/06* (2013.01); *B65G 47/19* (2013.01); *E21B 21/06* (2013.01); *E21B 41/00* (2013.01)

(58) Field of Classification Search
  CPC .......... B01F 2215/0081; B01F 15/0235; B01F 15/0243; B62D 63/06; E21B 21/06; E21B 41/00; B65G 47/19; B65G 65/30
  See application file for complete search history.

(56) References Cited

U.S. PATENT DOCUMENTS

| | | |
|---|---|---|
| 1,519,153 A | 9/1923 | Mitton |
| 1,726,603 A | 9/1929 | Wallace |
| 1,795,987 A | 3/1931 | Adams |
| 2,172,244 A | 9/1939 | Grundler |
| 2,231,911 A * | 2/1941 | Hitt ............... B29B 7/186 366/300 |
| 2,281,497 A | 4/1942 | Hyson et al. |
| 2,385,245 A | 9/1945 | Willoughby |
| 2,415,782 A | 2/1947 | Zademach |
| 2,513,012 A * | 6/1950 | Dugas ............... B28C 5/386 366/27 |
| 2,563,470 A | 8/1951 | Kane |
| 2,652,174 A | 9/1953 | Shea |
| 2,670,866 A | 3/1954 | Glesby |
| 2,678,737 A | 5/1954 | Mangrum |
| 2,703,659 A | 3/1955 | Hutchins |
| 2,756,073 A | 7/1956 | Bridge |
| 2,759,737 A | 8/1956 | Manning |
| 2,802,603 A | 8/1957 | McCray |
| 2,867,336 A * | 1/1959 | Soldini ............. B28C 7/0486 414/21 |
| 3,049,248 A | 8/1962 | Heltzel et al. |
| 3,083,879 A | 4/1963 | Coleman |
| 3,151,779 A | 10/1964 | Rensch et al. |
| 3,203,370 A * | 8/1965 | Haug .............. B01F 7/00708 366/85 |
| 3,217,927 A | 11/1965 | Bale, Jr. et al. |
| 3,315,826 A | 4/1967 | Gardner |
| 3,318,473 A | 5/1967 | Jones et al. |
| 3,326,572 A | 6/1967 | Murray |
| 3,343,688 A | 9/1967 | Ross |
| 3,354,918 A | 11/1967 | Coleman |
| 3,380,333 A | 4/1968 | Clay et al. |
| 3,404,963 A | 10/1968 | Fritsche et al. |
| 3,410,530 A * | 11/1968 | Gilman .................. B01F 3/18 366/76.2 |
| 3,432,151 A * | 3/1969 | O'Loughlin .......... E21B 21/062 366/6 |
| 3,467,408 A | 9/1969 | Regalia |
| 3,476,270 A | 11/1969 | Cox et al. |
| 3,602,400 A | 8/1971 | Cooke |
| 3,627,555 A | 12/1971 | Driscoll |
| 3,698,693 A * | 10/1972 | Poncet ............... B01F 7/082 366/301 |
| 3,785,534 A | 1/1974 | Smith |
| 3,802,584 A | 4/1974 | Sackett, Sr. et al. |
| 3,986,708 A | 10/1976 | Heltzel et al. |
| 4,023,719 A | 5/1977 | Noyon |
| 4,058,239 A | 11/1977 | Van Mill |
| 4,138,163 A | 2/1979 | Calvert et al. |
| 4,178,117 A | 12/1979 | Brugler |
| 4,204,773 A | 5/1980 | Bates |
| 4,248,337 A | 2/1981 | Zimmer |
| 4,258,953 A | 3/1981 | Johnson |
| 4,313,708 A | 2/1982 | Tiliakos |
| 4,395,052 A | 7/1983 | Rash |
| 4,398,653 A | 8/1983 | Daloisio |
| 4,423,884 A | 1/1984 | Gevers |
| 4,544,279 A * | 10/1985 | Rudolph .................. B29B 7/72 366/132 |
| 4,548,507 A | 10/1985 | Mathis et al. |
| 4,583,663 A | 4/1986 | Bonerb |
| 4,626,166 A | 12/1986 | Jolly |
| 4,701,095 A | 10/1987 | Berryman et al. |
| 4,806,065 A | 2/1989 | Holt et al. |
| 4,850,702 A * | 7/1989 | Arribau .................. B01F 5/22 366/136 |
| 4,856,681 A | 8/1989 | Murray |
| 4,900,157 A * | 2/1990 | Stegemoeller ........ B01F 3/1271 366/132 |
| 4,919,540 A | 4/1990 | Stegemoeller et al. |
| 4,956,821 A | 9/1990 | Fenelon |
| 4,993,883 A | 2/1991 | Jones |
| 4,997,335 A | 3/1991 | Prince |
| 5,036,979 A | 8/1991 | Selz |
| 5,096,096 A | 3/1992 | Calaunan |
| 5,114,169 A | 5/1992 | Botkin et al. |
| 5,149,192 A * | 9/1992 | Hamm .................. B28C 9/0454 366/134 |
| 5,303,998 A | 4/1994 | Whitlatch et al. |
| 5,339,996 A | 8/1994 | Dubbert et al. |
| 5,343,813 A | 9/1994 | Septer |
| 5,375,730 A | 12/1994 | Bahr et al. |
| 5,401,129 A | 3/1995 | Eatinger |
| 5,413,154 A | 5/1995 | Hurst, Jr. et al. |
| 5,426,137 A * | 6/1995 | Allen ..................... B01F 3/1271 366/158.4 |
| 5,441,321 A | 8/1995 | Karpisek |
| 5,443,350 A | 8/1995 | Wilson |
| 5,445,289 A | 8/1995 | Owen |
| 5,590,976 A * | 1/1997 | Kilheffer .................. E01C 19/46 404/72 |
| 5,609,417 A | 3/1997 | Otte |
| 5,722,552 A | 3/1998 | Olson |
| 5,772,390 A | 6/1998 | Walker |
| 5,806,441 A | 9/1998 | Chung |
| 5,913,459 A | 6/1999 | Gill et al. |
| 5,915,913 A | 6/1999 | Greenlaw et al. |
| 5,927,356 A | 7/1999 | Henderson |
| 5,944,470 A | 8/1999 | Bonerb |
| 5,997,099 A | 12/1999 | Collins |
| 6,059,372 A | 5/2000 | McDonald et al. |
| 6,112,946 A | 9/2000 | Bennett et al. |
| 6,126,307 A | 10/2000 | Black et al. |
| 6,193,402 B1 * | 2/2001 | Grimland .............. B01F 3/1221 366/14 |
| 6,247,594 B1 | 6/2001 | Garton |
| 6,379,086 B1 | 4/2002 | Goth |
| 6,425,627 B1 | 7/2002 | Gee |
| 6,491,421 B2 * | 12/2002 | Rondeau .............. B01F 3/1271 366/8 |
| 6,517,232 B1 * | 2/2003 | Blue .................... B01F 3/1228 366/297 |
| 6,536,939 B1 * | 3/2003 | Blue ....................... B01F 3/14 366/297 |
| 6,537,015 B2 | 3/2003 | Lim et al. |
| 6,568,567 B2 | 5/2003 | McKenzie et al. |
| 6,622,849 B1 | 9/2003 | Sperling |
| 6,655,548 B2 | 12/2003 | McClure, Jr. et al. |
| 6,876,904 B2 | 4/2005 | Oberg et al. |
| 6,980,914 B2 | 12/2005 | Bivens et al. |
| 7,008,163 B2 | 3/2006 | Russell |
| 7,086,342 B2 | 8/2006 | O'Neall et al. |
| 7,100,896 B1 | 9/2006 | Cox |
| 7,114,905 B2 | 10/2006 | Dibdin |

(56) References Cited

U.S. PATENT DOCUMENTS

| | | |
|---|---|---|
| 7,252,309 B2 | 8/2007 | Eng Soon et al. |
| 7,284,579 B2 | 10/2007 | Elgan |
| 7,451,015 B2 | 11/2008 | Mazur et al. |
| 7,475,796 B2 | 1/2009 | Garton |
| 7,500,817 B2 | 3/2009 | Furrer et al. |
| 7,513,280 B2 | 4/2009 | Brashears et al. |
| 7,665,788 B2 | 2/2010 | Dibdin et al. |
| 7,762,281 B2 | 7/2010 | Schuld |
| 7,997,213 B1 | 8/2011 | Gauthier et al. |
| 8,387,824 B2 | 3/2013 | Wietgrefe |
| 8,434,990 B2 | 5/2013 | Claussen |
| D688,349 S | 8/2013 | Oren et al. |
| D688,350 S | 8/2013 | Oren et al. |
| D688,351 S | 8/2013 | Oren et al. |
| D688,772 S | 8/2013 | Oren et al. |
| 8,505,780 B2 | 8/2013 | Oren |
| 8,545,148 B2 | 10/2013 | Wanek-Pusset et al. |
| 8,573,917 B2 | 11/2013 | Renyer |
| 8,585,341 B1 | 11/2013 | Oren |
| 8,607,289 B2 | 12/2013 | Brown et al. |
| 8,616,370 B2 | 12/2013 | Allegretti et al. |
| 8,622,251 B2 | 1/2014 | Oren |
| 8,662,525 B1 | 3/2014 | Dierks et al. |
| 8,668,430 B2 * | 3/2014 | Oren ............ B65D 90/58 414/810 |
| D703,582 S | 4/2014 | Oren |
| 8,827,118 B2 | 9/2014 | Oren |
| 8,834,012 B2 | 9/2014 | Case et al. |
| 8,887,914 B2 | 11/2014 | Allegretti et al. |
| RE45,713 E | 10/2015 | Oren et al. |
| 9,162,603 B2 | 10/2015 | Oren |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,340,353 B2 * | 5/2016 | Oren ............ B65G 47/19 |
| 9,358,916 B2 | 6/2016 | Oren |
| 9,394,102 B2 * | 7/2016 | Oren ............ B65D 88/121 |
| 9,403,626 B2 | 8/2016 | Oren |
| 9,421,899 B2 | 8/2016 | Oren |
| 9,440,785 B2 * | 9/2016 | Oren ............ B65D 83/06 |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| 9,617,065 B2 | 4/2017 | Allegretti et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 * | 6/2017 | Glynn ............ E21B 41/00 |
| 9,676,554 B2 | 6/2017 | Glynn et al. |
| 9,682,815 B2 | 6/2017 | Oren |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,993 B1 | 9/2017 | Allegretti et al. |
| 9,771,224 B2 | 9/2017 | Oren et al. |
| 9,783,338 B1 | 10/2017 | Allegretti et al. |
| 9,796,319 B1 | 10/2017 | Oren |
| 9,796,504 B1 | 10/2017 | Allegretti et al. |
| 9,809,381 B2 | 11/2017 | Oren et al. |
| 9,815,620 B2 * | 11/2017 | Oren ............ B65D 88/30 |
| 9,828,135 B2 | 11/2017 | Allegretti et al. |
| 9,840,366 B2 | 12/2017 | Oren et al. |
| 9,969,564 B2 | 5/2018 | Oren et al. |
| 9,988,182 B2 | 6/2018 | Allegretti et al. |
| 10,059,246 B1 | 8/2018 | Oren |
| 10,081,993 B2 | 9/2018 | Walker et al. |
| 10,189,599 B2 | 1/2019 | Allegretti et al. |
| 10,207,753 B2 | 2/2019 | O'Marra et al. |
| 10,287,091 B2 | 5/2019 | Allegretti |
| 10,308,421 B2 | 6/2019 | Allegretti |
| 10,464,741 B2 * | 11/2019 | Oren ............ B65D 88/121 |
| 10,486,854 B2 | 11/2019 | Allegretti et al. |
| 10,518,828 B2 | 12/2019 | Oren et al. |
| 10,569,242 B2 * | 2/2020 | Stegemoeller ......... B01F 5/0065 |
| 10,604,338 B2 | 3/2020 | Allegretti |
| 10,661,980 B2 * | 5/2020 | Oren ............ B65G 65/30 |
| 10,661,981 B2 * | 5/2020 | Oren ............ B65D 88/28 |
| 2002/0121464 A1 | 9/2002 | Soldwish-Zoole et al. |
| 2003/0159310 A1 * | 8/2003 | Hensley ............ E21B 21/066 34/357 |
| 2004/0008571 A1 * | 1/2004 | Goody ............ C09K 8/68 366/154.1 |
| 2004/0031335 A1 | 2/2004 | Fromme et al. |
| 2004/0206646 A1 | 10/2004 | Goh et al. |
| 2004/0258508 A1 | 12/2004 | Jewell |
| 2005/0219941 A1 * | 10/2005 | Christenson ............ B01F 7/085 366/18 |
| 2006/0013061 A1 | 1/2006 | Bivens et al. |
| 2007/0014185 A1 | 1/2007 | Diosse et al. |
| 2007/0201305 A1 | 8/2007 | Heilman et al. |
| 2008/0187423 A1 | 8/2008 | Mauchle |
| 2008/0294484 A1 | 11/2008 | Furman et al. |
| 2009/0078410 A1 | 3/2009 | Krenek et al. |
| 2009/0129903 A1 | 5/2009 | Lyons, III |
| 2009/0292572 A1 | 11/2009 | Alden et al. |
| 2009/0314791 A1 | 12/2009 | Hartley et al. |
| 2010/0196129 A1 | 8/2010 | Buckner |
| 2010/0319921 A1 | 12/2010 | Eia et al. |
| 2012/0017812 A1 | 1/2012 | Renyer et al. |
| 2012/0018093 A1 | 1/2012 | Zuniga et al. |
| 2012/0037231 A1 | 2/2012 | Janson |
| 2012/0181093 A1 | 7/2012 | Fehr et al. |
| 2012/0219391 A1 | 8/2012 | Teichrob et al. |
| 2013/0128687 A1 * | 5/2013 | Adams ............ B01F 15/00253 366/138 |
| 2013/0135958 A1 | 5/2013 | O'Callaghan |
| 2013/0142601 A1 | 6/2013 | McIver et al. |
| 2013/0206415 A1 * | 8/2013 | Sheesley ............ B65G 65/00 166/308.1 |
| 2013/0284729 A1 * | 10/2013 | Cook ............ B65D 90/54 220/1.5 |
| 2014/0023463 A1 | 1/2014 | Oren |
| 2014/0023464 A1 | 1/2014 | Oren et al. |
| 2014/0044508 A1 | 2/2014 | Luharuka et al. |
| 2014/0076569 A1 * | 3/2014 | Pham ............ G05D 7/0617 166/305.1 |
| 2014/0083554 A1 | 3/2014 | Harris |
| 2014/0216736 A1 | 8/2014 | Leugemors et al. |
| 2014/0299226 A1 | 10/2014 | Oren et al. |
| 2014/0305769 A1 | 10/2014 | Eiden, III et al. |
| 2014/0377042 A1 * | 12/2014 | McMahon ............ B65G 63/008 414/293 |
| 2015/0003943 A1 | 1/2015 | Oren et al. |
| 2015/0003955 A1 | 1/2015 | Oren et al. |
| 2015/0016209 A1 | 1/2015 | Barton et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0353293 A1 | 12/2015 | Richard |
| 2015/0366405 A1 | 12/2015 | Manchuliantsau |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0130095 A1 | 5/2016 | Oren et al. |

(56) References Cited

U.S. PATENT DOCUMENTS

| | | |
|---|---|---|
| 2016/0244279 A1 | 8/2016 | Oren et al. |
| 2016/0264352 A1 | 9/2016 | Oren |
| 2016/0332809 A1 | 11/2016 | Harris |
| 2016/0332811 A1 | 11/2016 | Harris |
| 2017/0021318 A1 | 1/2017 | McIver et al. |
| 2017/0123437 A1 | 5/2017 | Boyd et al. |
| 2017/0129696 A1 | 5/2017 | Oren |
| 2017/0144834 A1 | 5/2017 | Oren et al. |
| 2017/0190523 A1 | 7/2017 | Oren et al. |
| 2017/0203915 A1 | 7/2017 | Oren |
| 2017/0217353 A1 | 8/2017 | Vander Pol et al. |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1* | 10/2017 | Oren ........................ B60P 1/56 |
| 2017/0313497 A1 | 11/2017 | Schaffner et al. |
| 2017/0334639 A1* | 11/2017 | Hawkins ................ B65D 90/20 |
| 2017/0349226 A1 | 12/2017 | Oren et al. |
| 2018/0257814 A1 | 9/2018 | Allegretti et al. |
| 2018/0369762 A1* | 12/2018 | Hunter .................... B01F 3/184 |
| 2019/0009231 A1 | 1/2019 | Warren et al. |
| 2019/0111401 A1 | 4/2019 | Lucas et al. |
| 2020/0062448 A1 | 2/2020 | Allegretti et al. |
| 2020/0147566 A1* | 5/2020 | Stegemoeller ............ B01F 3/12 |

FOREIGN PATENT DOCUMENTS

| | | |
|---|---|---|
| GB | 2204847 A1 | 11/1988 |
| JP | 2008239019 A | 10/2008 |
| WO | 2008012513 A2 | 1/2008 |
| WO | 2012/017444 A1 | 2/2012 |
| WO | 2013095871 A1 | 6/2013 |
| WO | 2013142421 A1 | 9/2013 |
| WO | 2014018129 A1 | 1/2014 |
| WO | 2014018236 A2 | 5/2014 |
| WO | 2015119799 A1 | 8/2015 |
| WO | 2015191150 A1 | 12/2015 |
| WO | 2015192061 A1 | 12/2015 |
| WO | 2016044012 A1 | 3/2016 |
| WO | 2016160067 A1 | 10/2016 |

OTHER PUBLICATIONS

International Search Report and Written Opinion issued in related PCT Application No. PCT/US2016/022489 dated Dec. 14, 2016, 12 pages.

Office Action issued in related Canadian Patent Application No. 2,996,055 dated Oct. 2, 2020, 5 pages.

U.S. Pat. No. 0,802,254A, Oct. 17, 1905, "Can-Cooking Apparatus," John Baker et al.

* cited by examiner

MULLING DEVICE AND METHOD FOR TREATING BULK MATERIAL RELEASED FROM PORTABLE CONTAINERS

CROSS-REFERENCE TO RELATED APPLICATION

The present application is a U.S. National Stage Application of International Application No. PCT/US2016/022489 filed Mar. 15, 2016, which is incorporated herein by reference in its entirety for all purposes.

TECHNICAL FIELD

The present disclosure relates generally to transferring and treating dry bulk materials and, more particularly, to a mulling device for treating bulk material released from portable containers.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material is normally transported to a well site in a commercial or common carrier tank truck. Once the tank truck and mixing system are at the well site, the dry powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (e.g., silo). The storage/delivery system may then deliver the bulk material onto a conveyor or into a hopper, which meters the bulk material through a chute into a blender tub.

Recent developments in bulk material handling operations involve the use of portable containers for transporting dry material about a well location. The containers can be brought in on trucks, unloaded, stored on location, and manipulated about the well site when the material is needed. The containers are generally easier to manipulate on location than a large supply tank trailer. For certain wellbore treatments, it can be desirable to pre-mix additives (e.g., coatings, liquid additives) into the bulk material on location prior to the material being provided to a blender.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for efficiently managing bulk material (e.g., bulk solid or liquid material). Bulk material handling systems are used in a wide variety of contexts including, but not limited to, drilling and completion of oil and gas wells, concrete mixing applications, agriculture, and others. The disclosed embodiments are directed to systems and methods for efficiently combining additives into bulk material while transferring the bulk material about a job site. The systems may include a support structure used to receive one or more portable containers of bulk material, and a mulling device disposed beneath and coupled to the support structure to provide bulk material treatment capabilities. Specifically, the mulling device may facilitate mixing of coatings or other additives with bulk material that is released from the portable containers, as well as transfer of the mixture to an outlet location. The disclosed techniques may be used to efficiently handle any desirable bulk material having a solid or liquid constituency including, but not limited to, sand, proppant, get particulate, diverting agent, dry-gel particulate, and others.

In currently existing on-site bulk material handling applications, dry material (e.g., sand, proppant, gel particulate, or dry-gel particulate) may be used during the formation of treatment fluids. In such applications, the bulk material is often transferred between transportation units, storage tanks, blenders, and other on-site components via pneumatic transfer, sand screws, chutes, conveyor belts, and other components. Recently, a new method for transferring bulk material to a hydraulic fracturing site involves using portable containers to transport the bulk material. The containers can be brought in on trucks, unloaded, stored on location, and manipulated about the site when the material is needed. These containers generally include a discharge gate at the bottom that can be actuated to empty the material contents of the container at a desired time.

The disclosed material handling system provides an efficient method for transferring bulk material from these transportable containers and conditioning the material by mulling the bulk material with one or more additives before it is delivered to a blender, mixer, or pump. The material handling system may include a support structure designed to receive and hold at least one portable container of bulk material at an elevated position, and a mulling device disposed beneath and coupled to the support structure. The mulling device is used to combine the bulk material that is discharged from the removable containers with additives to coat or otherwise condition the material. The term "mulling" may refer to a process of mixing dry elements (e.g., dry bulk material) with a wetting substance or coating substance (semi-dry or semi-wet). The mulling device is also used to transfer the treated bulk material to an output location, such as into a blender or a pump. The mulling device and the support structure may be integrated into a trailer frame for easy mobility.

By incorporating a mulling device into the support structure, the disclosed material handling system may allow for conditioning of the bulk material (e.g., dry proppant) prior to wetting the bulk material in a mixing tub of a blender. This conditioning may include an application of coatings (e.g., SandWedge™, FinesWedge™, resin coatings, etc), gelling agents, diverters, friction reducers, surfactants, or other liquid additives to the bulk material. In some embodiments, the mulling device may facilitate all the conditioning/wetting of the bulk material used to generate a treatment fluid for use in a downhole environment. As a result, the treatment fluid may be output from the mulling device directly to a fluid pump, instead of a blender.

The disclosed support structure may provide an elevated location for one or more bulk material containers to be placed while the proppant (or any other bulk material used in fluid mixtures at a job site) is transferred from the containers to the mulling device. The support structure may elevate the bulk material containers to a sufficient height above the mulling device and a blender or pump inlet such that the bulk material can be routed from the containers directly through the mulling device and into the blender or pump inlet. This may eliminate the need for any subsequent pneumatic or mechanical conveyance of the bulk material (e.g., via a separate mechanical conveying system) from the containers to the blender or pump. This may improve the energy efficiency of bulk material handling operations at a job site. In addition, the combined support structure and mulling device may simplify the operation of transferring bulk material, reduce material spillage, and decrease dust generation.

Figure 1:
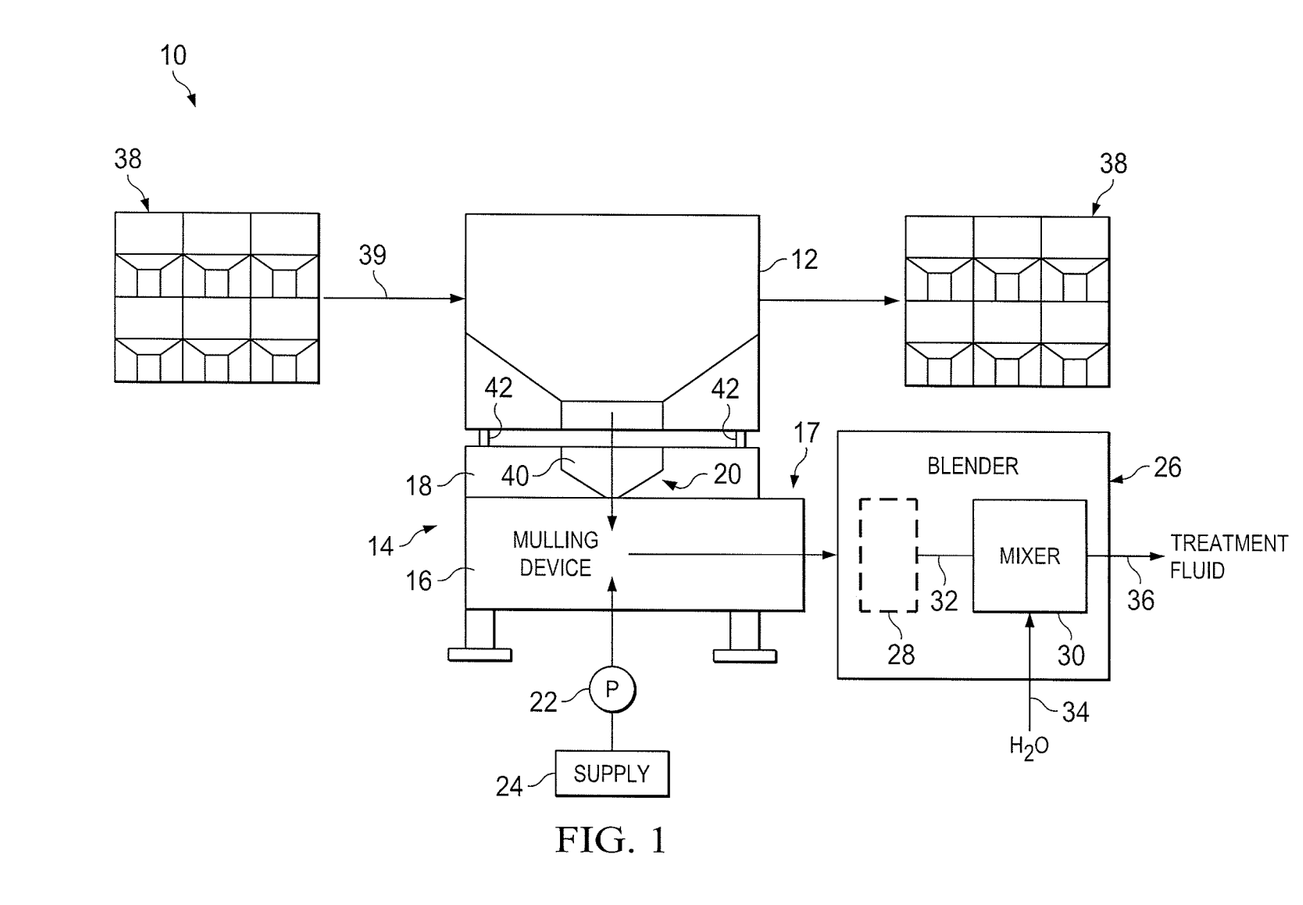
FIG. 1 is a schematic block diagram of a bulk material handling system having a mulling device suitable for treating and transferring bulk material from a portable container to a blender unit, in accordance with an embodiment of the present disclosure.

Turning now to the drawings, FIG. 1 is a block diagram of a bulk material handling system 10. The system 10 includes a container 12 elevated on a portable support structure 14 and holding a quantity of bulk material (e.g., solid or liquid treating material). A mulling device 16 is disposed beneath and coupled to the support structure 14. The mulling device 16 may utilize one or more mulling screws (not shown) to combine bulk material from the container 12 with additives while advancing the bulk material toward an outlet 17.

In some embodiments, the portable support structure 14 may include a frame 18 for receiving and holding the container 12, and a gravity feed outlet 20 for directing bulk material away from the container 12. The outlet 20 may be coupled to and extending from the frame 18 to direct bulk material from the container 12 directly into the mulling device 16. The outlet 20 may utilize a gravity feed to provide a controlled, i.e. metered, flow of bulk material from the container 12 into the mulling device 16. In other embodiments, the support structure 14 may function just as a frame for receiving and supporting the container 12, and the container 12 may selectively dispense bulk material directly into the mulling device 16 via gravity.

Regardless of how the bulk material enters the mulling device 16, the mulling device 16 may combine the bulk material with one or more additives provided to the mulling device 16 while also transferring the combined mixture of bulk material and additives to another component positioned at the outlet 17 of the mulling device 16. The additives mixed into the bulk material via the mulling device 16 may include, for example, coatings (SandWedge™, FinesWedge™, resin coatings, etc.) other gelling agents, diverters, friction reducers, surfactants, or other liquid additives. In some embodiments, the mulling device 16 may be used to generate "liquid sand", which is a thick mixture of sand (bulk material) suspended in gel (additive).

In some embodiments, the system 10 may include one or more pumps 22 used to draw liquid additive from a fluid supply container 24 that is not directly supported with the support structure 14 and the mulling device 16. The pumps 22 may be integrated into the same structure as the support structure 14 and the mulling device 16. As those of ordinary skill in the art will appreciate, inlets for additives introduced into the mulling device may comprise more than the one input flow line illustrated in FIG. 1.

The mulling device 16 may provide a controlled, i.e. metered, flow of bulk material (combined with other additives) to another component disposed at the outlet 17 of the mulling device 16. In FIG. 1, for example, the mulling device 16 may transfer the combination of bulk material and additives to a blender unit 26. Once the bulk material has been mulled, the mulling device 16 may discharge the bulk material combined with additives into the blender unit 26 to be further mixed with additional liquid to form a final treatment fluid or slurry.

In some embodiments, the blender unit 26 may include a hopper 28 and a mixer 30 (e.g., mixing compartment). The blender unit 26 may also include a metering mechanism 32 for providing a controlled, i.e. metered, flow of bulk material from the hopper 28 to the mixer 30. The metering mechanism 32 may be an auger or similar device that lifts the bulk material mixture from the hopper 28 into a relatively large mixer 30.

In other embodiments, the blender unit 26 may not include the hopper 28. Instead, the system 10 may be designed such that the mulling device 16 provides bulk material directly into the mixer 30 of the blender unit 26. That way, the blender unit 26 does not require additional power for operating an auger or similar metering mechanism 32. This arrangement also reduces the amount of equipment on site, since the hopper 28 and metering mechanism 32 are not required. Further, providing the bulk material mixed with additives directly from the mulling device 16 to the mixer 30 may reduce or eliminate a source of dust on location from the hopper and elevated auger. In addition, transferring the bulk material with additives via horizontally oriented mulling screws is a more efficient use of energy than metering the bulk material upward into an elevated mixer.

Wetting substances such as water or other liquid additives may be supplied to the mixer 30 (e.g., mixing compartment) through a fluid inlet 34. As those of ordinary skill in the art will appreciate, the fluid inlet 34 may comprise more than the one input flow line illustrated in FIG. 1. The water or other liquid additives may be mixed with the already pre-combined bulk material/additives mixture to produce (at an outlet 36) a treatment fluid. This treatment fluid may include, for example, a fracing fluid, a mixture combining several types of proppant, proppant/dry-gel particulate mixture, sand/sand-diverting agents mixture, cement slurry, drilling mud, a mortar or concrete mixture, or any other fluid mixture for use on location. The outlet 36 may be coupled to a pump for delivering the treatment fluid to a desired location (e.g., a hydrocarbon recovery well) for a treating process.

Figure 2:
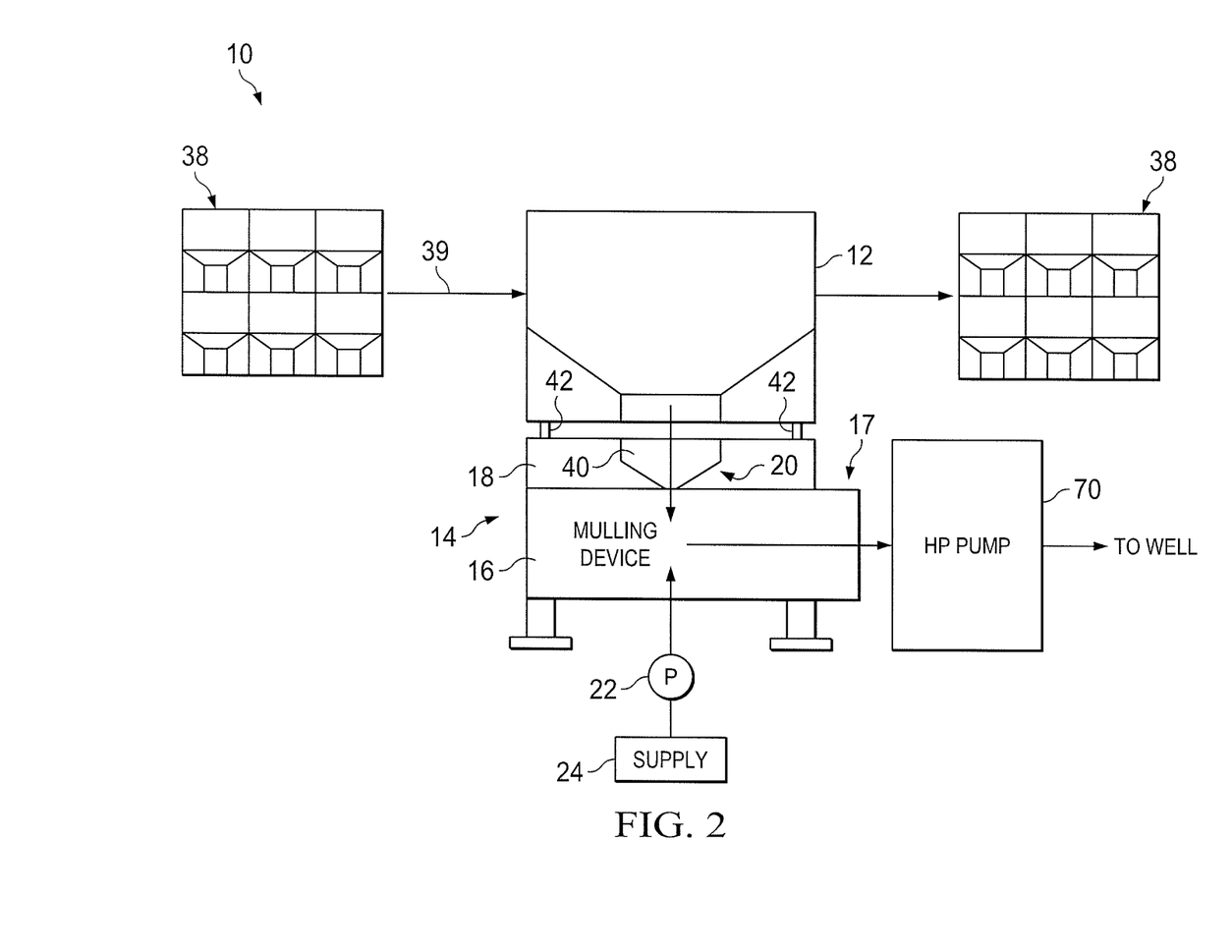
FIG. 2 is a schematic block diagram of a bulk material handling system having a mulling device suitable for treating and transferring bulk material from a portable container to a pump, in accordance with an embodiment of the present disclosure.

As shown in FIG. 2, other embodiments of the disclosed system 10 may utilize the mulling device 16 to mix and transfer a combination of bulk material and additives directly to a pump 70. In such instances, the mulling device may introduce all the desired additives and a sufficient amount of liquid into the bulk material to form the final treatment fluid or slurry. Thus, the mulling device 16 may perform the functions that would otherwise be performed by a separate blender unit (e.g., 26 of FIG. 1). A mulling device 16 may output the process ready treatment fluid or slurry directly into the pump 70 (e.g., high pressure pump), which then pumps the treatment fluid to a desired location (e.g., a hydrocarbon recovery well) for a treating process.

It should be noted that the disclosed system 10 of FIGS. 1 and 2 may be used in other contexts as well. For example, the bulk material handling system 10 may be used in concrete mixing operations (e.g., at a construction site) to dispense aggregate from the container 12 through the mulling device 16 (adding other aggregate, coatings, or liquid additives) and into a final concrete mixing apparatus (mixer 30). In addition, the bulk material handling system 10 may be used in agriculture applications to dispense grain, feed, or seed from containers 12 into a mulling device 16 for combination with fertilizers, coatings, and/or other additives.

It should be noted that the disclosed container 12, support structure 14, and mulling device 16 of FIGS. 1 and 2 may be utilized to condition bulk material for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

As illustrated, the container 12 may be elevated above an outlet location via the support structure 14. The support structure 14 is designed to elevate the container 12 above the level of the mulling device 16 (and a blender/pump inlet) to allow the bulk material to gravity feed from the container 12 to the mulling device 16. This way, the container 12 is able to sit on the support structure 14 and output bulk material directly into the mulling device 16 via a gravity feed.

Although shown as supporting a single container 12, other embodiments of the support structure 14 may be configured to support multiple containers 12. The exact number of containers 12 that the support structure 14 can hold may depend on a combination of factors such as, for example, the volume, width, and weight of the containers 12 to be disposed thereon.

In any case, the container(s) 12 may be completely separable and transportable from the support structure 14, such that any container 12 may be selectively removed from the support structure 14 and replaced with another container 12. That way, once the bulk material from the container 12 runs low or empties, a new container 12 may be placed on the support structure 14 to maintain a steady flow of bulk material to the mulling device 16 and ultimately an outlet location. In some instances, the container 12 may be closed before being completely emptied, removed from the support structure 14, and replaced by a container 12 holding a different type of bulk material to be provided to the mulling device 16.

A portable bulk storage system 38 may be provided at the site for storing one or more additional containers 12 of bulk material to be positioned on the frame 18 of the support structure 14. The bulk material containers 12 may be transported to the desired location on a transportation unit (e.g., truck). The bulk storage system 38 may be the transportation unit itself or may be a skid, a pallet, or some other holding area. One or more containers 12 of bulk material may be transferred from the storage system 38 onto the support structure 14, as indicated by arrow 39. This transfer may be performed by lifting the container 12 via a hoisting mechanism, such as a forklift, a crane, or a specially designed container management device.

When the one or more containers 12 are positioned on the support structure 14, discharge gates on one or more of the containers 12 may be opened, allowing bulk material to flow from the containers 12 into the outlet 20 of the support structure 14 and/or directly into the mulling device 16. The mulling device 16 may then mix additives into the bulk material while transferring the mixture directly into a blender, pump, or other output device.

After one or more of the containers 12 on the support structure 14 are emptied, the empty container(s) 12 may be removed from the support structure 14 via a hoisting mechanism. In some embodiments, the one or more empty containers 12 may be positioned on another bulk storage system 38 (e.g., a transportation unit, a skid, a pallet, or some other holding area) until they can be removed from the site and/or refilled. In other embodiments, the one or more empty containers 12 may be positioned directly onto a transportation unit for transporting the empty containers 12 away from the site. It should be noted that the same transportation unit used to provide one or more filled containers 12 to the location may then be utilized to remove one or more empty containers 12 from the site.

The bulk material may be discharged from the container 12 by the force of gravity upon opening a discharge gate (not shown) on the container 12. The support structure 14 may include a flow regulating mechanism 40 to control or regulate the flow of bulk material from the container 12 into the mulling device 16. In some embodiments, the flow regulating mechanism may be incorporated into the gravity feed outlet 20 of the support structure 14. In the illustrated embodiment, the flow regulating mechanism 40 may include a metered hopper that controls the rate of bulk material being discharged from the container 12 directly into the mulling device 16. Other types of flow regulating mechanisms 40, such as a flow control valve, may be incorporated into the support structure 14 to facilitate controlled flow of bulk material into the mulling device 16. Incorporating the flow regulating mechanism 40 into the support structure 14 (as opposed to the container 12) allows the container 12 to be fairly simple to construct and operate. That way, the interchangeable containers 12 may be used to simply output bulk material by the force of gravity, while the support structure 14 includes more complex components to meter or automate the flow of bulk material from the containers 12.

The support structure 14 may include other features as well. For example, actuators (not shown) may be disposed on the support structure and selectively controlled to actuate a discharge gate of the container 12 disposed on the support structure 14 between an open and closed position. In some embodiments, the support structure 14 may be equipped with sensing equipment and indicators (such as lights) for providing a visual indication of the presence, weight, or open/closed status of a container 12 disposed in a given location on the support structure 14. In the illustrated embodiment, the support structure 14 may include a positioning system for receiving the container 12 into a desired location on the support structure 14. The positioning system may include a plurality of alignment pins 42 (as shown), cradles, or any other desirable type of positioning system for ensuring that the container 12 is disposed in a correct position to deliver the bulk material contents of the container 12 to the mulling device 16.

Figure 3:
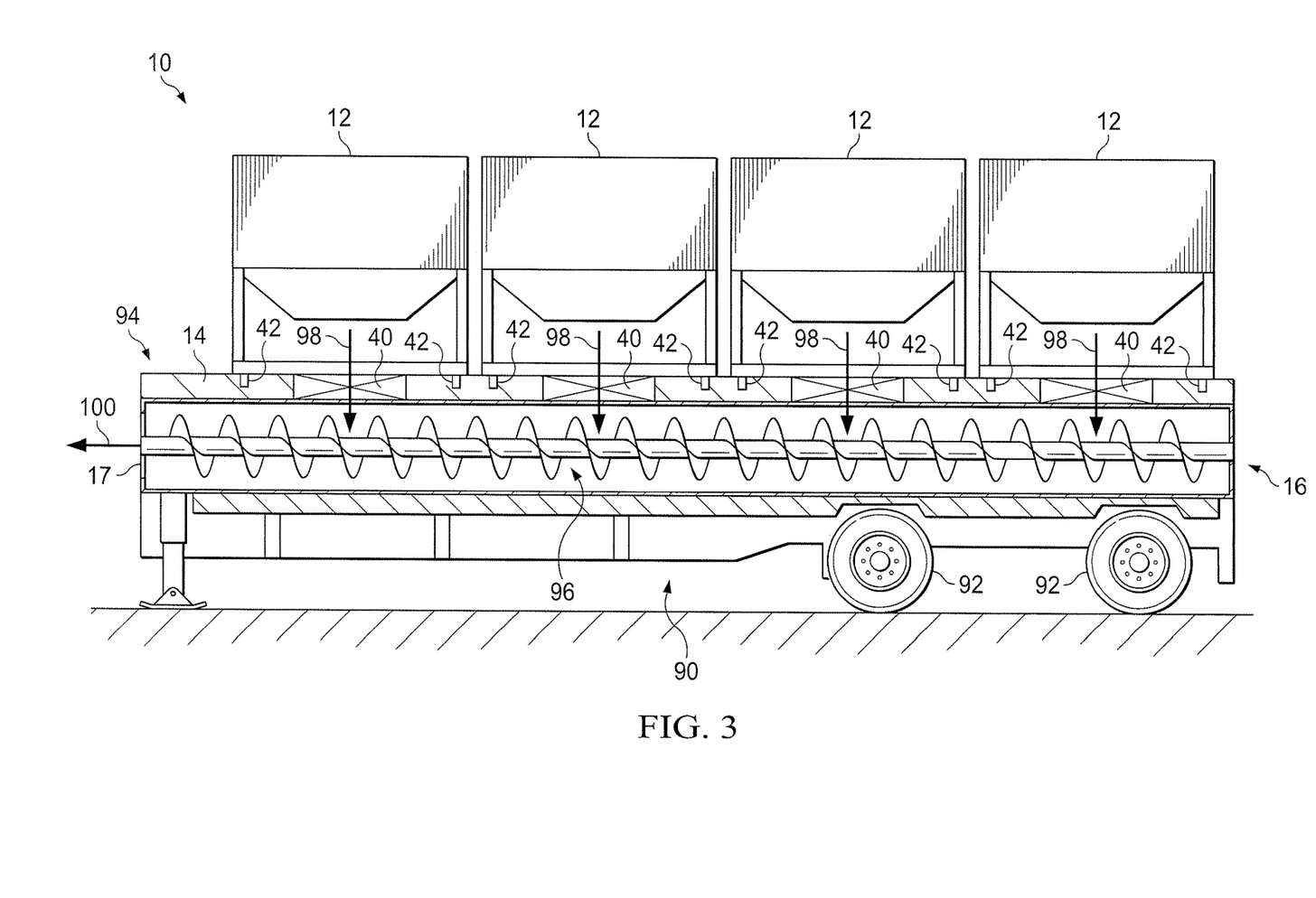
FIG. 3 is a schematic side view of a portable support structure having a mulling device used to treat and route bulk material to an output location, in accordance with an embodiment of the present disclosure.

FIG. 3 illustrates an embodiment of the material handling system 10 having the support structure 14 and the mulling device 16. The support structure 14 is generally disposed above and coupled directly to the mulling device 16. As shown, the support structure 14 and the mulling device 16 may be integrated into a specialized trailer unit 90. As mentioned above, the mulling device 16 may be used to combine multiple types of bulk materials (e.g., proppant), dry gel, surfactant, friction reducers, diverters, liquid additives, and other substances. Although not shown, one or more liquid additive pumps (e.g., 22 of FIGS. 1 and 2) may be added to the trailer unit 90 to draw fluid from separate fluid supply containers (e.g., 24 of FIGS. 1 and 2) into the mulling device 16.

In the illustrated embodiment, the support structure 14 may be designed to receive multiple containers 12. Specifically, the support structure 14 may include a frame sized to receive and support up to four portable containers 12. Although shown as supporting four containers 12, other embodiments of the support structure may be configured to support other numbers (e.g., 1, 2, 3, 5, 6, 7, 8, or more) of containers 12. The exact number of containers 12 that the support structure 14 can hold may depend on a combination of factors such as, for example, the volume, width, and weight of the containers 12 to be disposed thereon.

The support structure 14 may include a flow regulating mechanism 40 (such as a flow control valve) corresponding to each container receiving position on the support structure 14. In addition, each container receiving position on the support structure 14 may feature alignment pins 42 or some other type of positioning system for receiving/positioning the containers 12 on the support structure 14. As mentioned above, the positioning systems may ensure that the containers 12 discharge bulk material directly into a corresponding flow regulating mechanism 40 and, ultimately, the mulling device 16.

The mulling device 16 may include one or more mulling screws 96, which are described in greater detail below. The mulling screws 96, as illustrated, are generally oriented horizontally. One or more containers 12 may discharge bulk material into the mulling device 16 from above, as shown by arrows 98. Rotation of the mulling screws 96 may combine bulk material received from the one or more containers 12 with additives that are pumped or otherwise introduced into the mulling device 16. In addition, rotation of the mulling screws 96 transfers the bulk material mixed with additives horizontally toward the outlet end 17 of the mulling device 16, as shown by arrow 100. The bulk material and additive mixture exits the mulling device 16 (at the outlet 17) and moves directly into an adjacent blender unit, pump, or other piece of equipment on location.

It should be noted that, in some embodiments, it may be desirable to combine multiple different types of bulk material together via the mulling device 16. To that end, one or more of the containers 12 may hold a first type of bulk material, while another one or more containers 12 hold a second type of bulk material. The flow regulating mechanisms 40 for the different containers 12 may be specifically controlled to output a desired ratio of the first type to the second type of bulk material into the mulling device 16. The mulling device 16 may then mix the two (or more) types of bulk material, along with any desired additives, for transfer and output to another component on location.

In the illustrated embodiment, the trailer unit 90 includes wheels 92 for enabling transportation of the connected support structure 14 and mulling device 16 to and from a desired location (e.g., well site). In the illustrated embodiment, a front end 94 of the trailer unit 90 may be designed to lift up and hook onto a trailer hitch of a transportation vehicle. Once the trailer unit 90 is transported to the site, the front end 94 may be lifted off the transportation vehicle and the trailer unit 90 may be lowered directly to the ground, without the use of a hoisting mechanism (e.g., forklift, crane, etc.). The support structure 14 and mulling device 16 may be integrated into other types of mobile trailer units 90 as well.

Having the support structure 14 and mulling device 16 integrated into a mobile trailer unit 90 may improve the reliability of the various components that make up the support structure 14 and increase the life of the unit. This is because shock from movement of the relatively large support structure/mulling device about a site can lead to undesirable operation of the support structure components. With the support structure 14 and mulling device 16 integrated into the trailer unit 90, the shock due to loading/unloading the support structure 14 and mulling device 16 is minimized.

In some embodiments, the trailer unit 90 may include an air suspension system or other components to reduce shock on the support structure 14 during transportation of the trailer unit 90 (e.g., traveling along a road). The suspension system may help to isolate the electronics and controls of the support structure 14 and/or mulling device 16 from shock loading during transportation of the support structure trailer unit 90 along the road.

Figure 4:
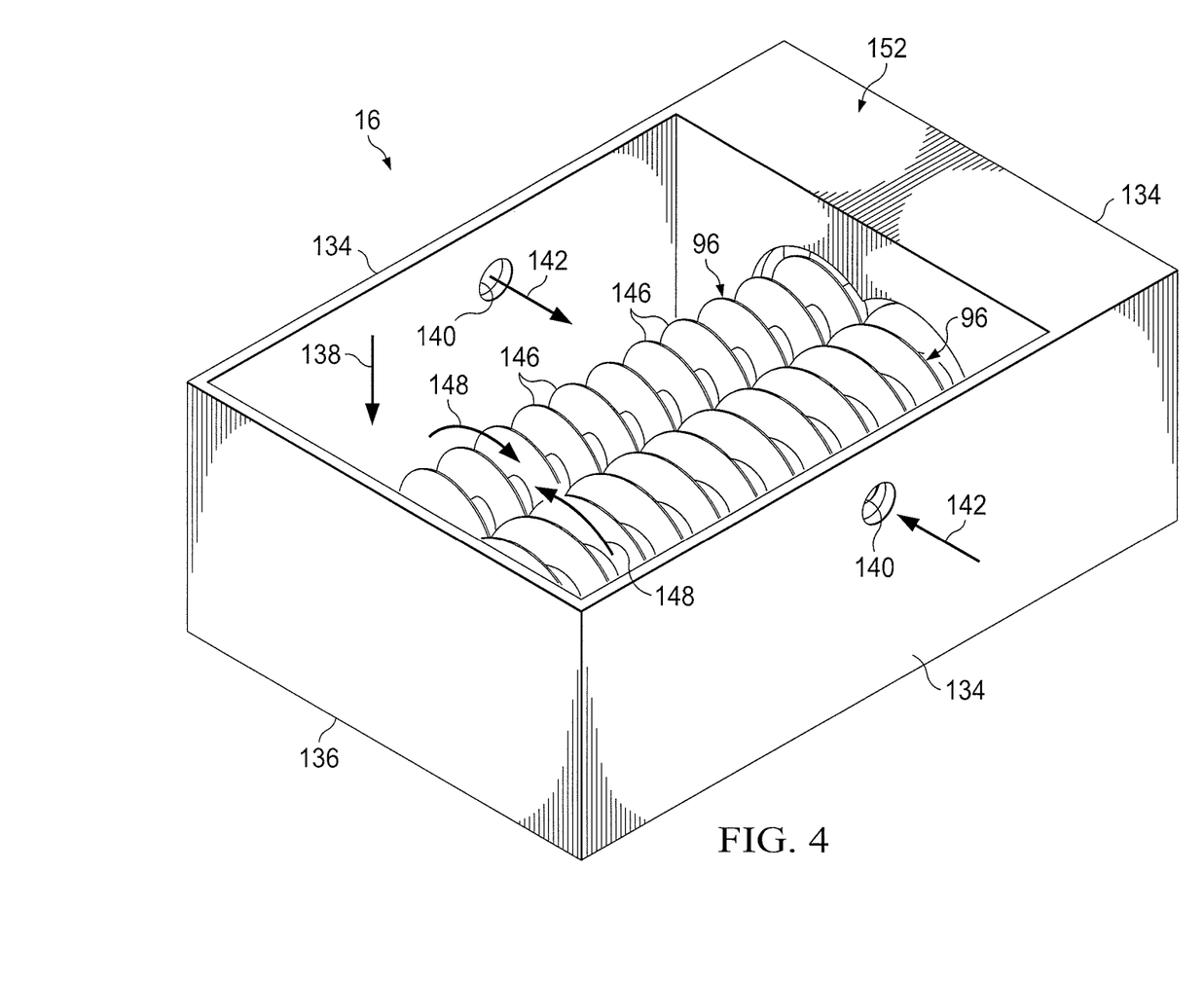
FIG. 4 is a perspective view of a mulling device that can be incorporated into a support structure, in accordance with an embodiment of the present disclosure.
Figure 5:
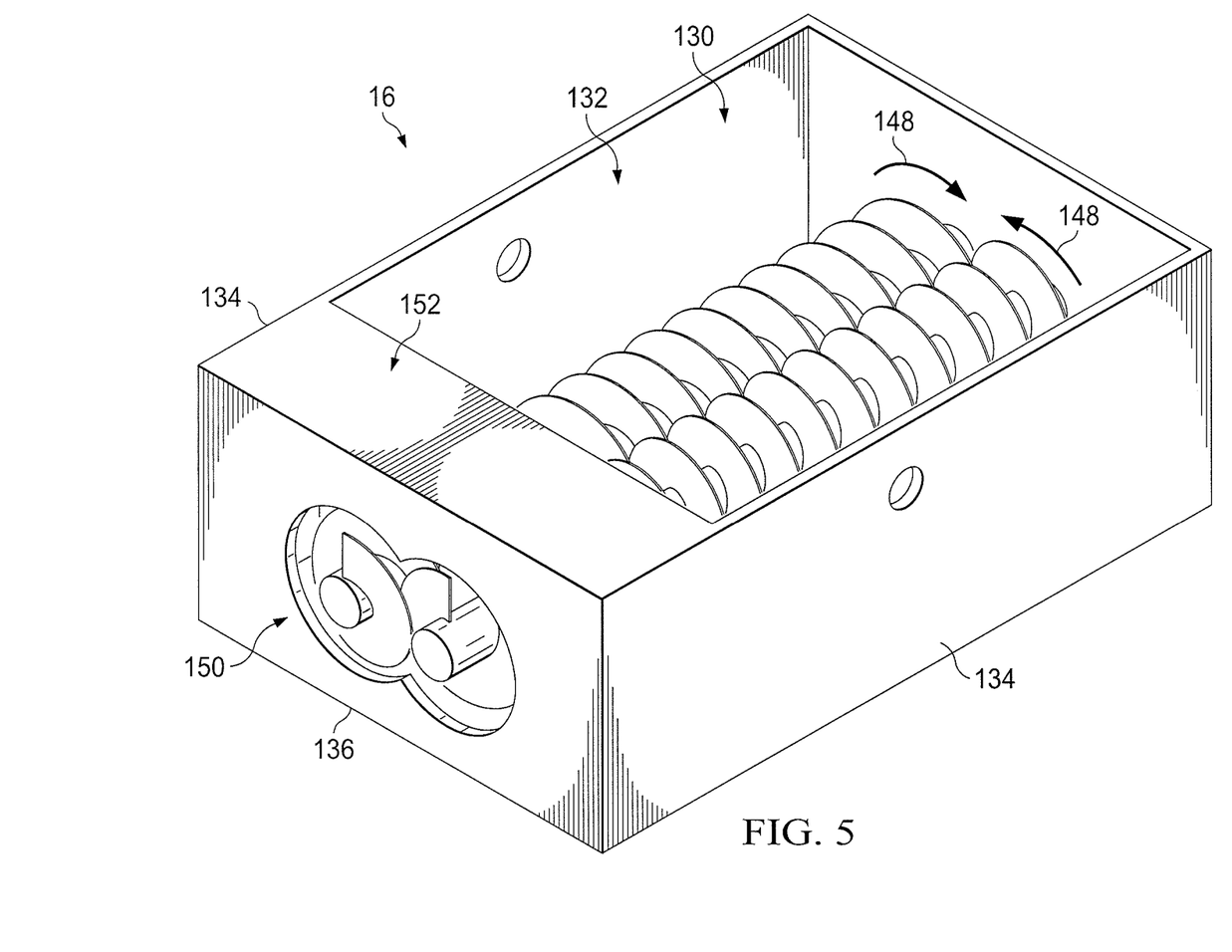
FIG. 5 is a perspective view of an outlet of the mulling device of FIG. 4, in accordance with an embodiment of the present disclosure.

FIGS. 4 and 5 illustrate a more detailed embodiment of the mulling device 16 that may be utilized in the disclosed bulk material handling system 10. It should be noted that the specific design of the mulling device 16 will depend on the type of bulk material that is being processed through the system as well as the amount of wetting liquid or liquid additive introduced into the mulling device.

The mulling device 16, as shown, may include an opening 130 at the top for receiving bulk material from one or more portable containers (12 of FIG. 3) disposed on the support structure (14 of FIG. 3). As shown, the upper opening 130 may be relatively large to accommodate a relatively heavy flow of bulk material discharged from the containers 12. The opening 130 provides access to a cavity 132 formed in the mulling device 16. In the illustrated embodiment, the cavity 132 is bounded by four side walls 134 and a bottom surface 136 of the mulling device 16. Bulk material may be dropped into the cavity 132 through the top opening 130 under a force of gravity, as shown by arrow 138.

The mulling device 16, as shown, may include an opening 130 at the top for receiving bulk material from one or more portable containers (12 of FIG. 3) disposed on the support structure (14 of FIG. 3). As shown, the upper opening 130 may be relatively large to accommodate a relatively heavy flow of bulk material discharged from the containers 12. The opening 130 provides access to a cavity 132 formed in the mulling device 16. In the illustrated embodiment, the cavity 132 is bounded by four side walls 134 and a bottom surface 136 of the mulling device 16. As shown, the mulling device 16 comprises a housing having the side walls 134 and bottom surface 136 and having the cavity 132 formed therein. Bulk material may be dropped into the cavity 132 through the top opening 130 under a force of gravity, as shown by arrow 138.

In the illustrated embodiment, the mulling device 16 utilizes a pair of mulling screws 96 to mull the bulk material with the additives to form a mixture. In other embodiments, different numbers or arrangements of mulling screws 96 may be used to condition the bulk material and transfer the bulk material/additive mixture to an outlet location. The mulling screws 96 may be specifically shaped to include interlocking threads or grooves 146 to pick up and mull the particles of bulk material that have been released into the cavity 132. The threads/grooves 146 may be any desirable thickness to accommodate the type of bulk material and additives being combined and transferred through the mulling device 16. The mulling screws 96 may work to massage the coating, liquid, resin, or other additives into the bulk material so that the additives cover the surface of every bulk material particle. That way, no large clumps of wet additive (or dry bulk material) will exit the mulling device 16.

At an outlet 150 or discharge end of the cavity 132, the mulling device 16 may include a shrouded section 152. The shrouded section 152 may include an elongated section of side wall 134 that the mulling screws 96 extend through to push the bulk material out of the cavity 132. This shrouded section 152 may enable the discharge end 150 of the mulling device 16 to function as a progressive cavity pump (or extruder). Bulk material that enters the shrouded section 152 through the grooves in the mulling screws 96 is forced into a compacted space and metered steadily through the outlet 150. A speed of the screws 96 may be controlled to meter the mixture of bulk material and additives out of the mulling device 16 at a desired rate.

The mulling screws 96 may be controlled to rotate in opposite directions (arrows 148) from one another so that the bulk material and liquid additives are effectively moved through and combined in the central region of the mulling device 16. The threads/grooves 146 on the mulling screws 96 may be oriented at a diagonal, as shown, so that as the mulling screws 96 rotate they push the bulk material/additive mixture toward the outlet 150 of the cavity 132.

In some embodiments, the mulling device 16 may be divided into multiple sections along its longitudinal axis. For example, the mulling device 16 may include multiple inlets 140 for introducing additives into the mulling device 16, the inlets 140 being disposed at different positions along the total length of the mulling device 16. This allows the mulling device 16 to mix different additives into the bulk material at different points as the bulk material is transferred through the mulling device 16 toward an outlet. In some embodiments, for example, a first inlet 140 (or pair of inlets 140) may introduce a first additive into the mulling device so that the mulling screws 96 mull the bulk material until it is coated in the first additive. At a further longitudinal position, a second inlet 140 (or pair of inlets 140) may introduce a second additive into the mulling device so that the mulling screws 96 mull the bulk material until a layer of the second additive forms over the first additive coating on the bulk material.

In other embodiments, different types of mulling screws 96 may be utilized at different longitudinal locations along the mulling device 16. For example, the mulling screws 96 may be designed with different patterns of threads/grooves 146 at the different longitudinal locations. In other embodiments, different longitudinal sections of the mulling device 16 may feature different numbers of mulling screws 96 used to mull the bulk material with the various additives.

In some embodiments, the mulling device 16 may be designed with a single cavity 132 extending the entire length of the mulling device 16. In other embodiments, the mulling device 16 may be divided into multiple longitudinal sections that each include a designated cavity 132 similar to the one illustrated in FIGS. 4 and 5. For example, the mulling device 16 used in the system of FIG. 3 may include four different cavities 132 formed therein, one beneath each of the portable container locations. The mulling screws 96 may extend through each of the cavities 132 along the length of the mulling device 16.

Other types, arrangements, and variations of components (e.g., cavity, opening, inlets, mulling screws, shrouded sections, etc.) may be utilized in the mulling device 16 to combine bulk material from the elevated portable containers 12 with fluid and other additives.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
   a support structure for holding at least one portable container of bulk material at an elevated position; and
   a mulling device disposed beneath the support structure, wherein the mulling device comprises:
      a housing having at least a plurality of side walls, a bottom, and a cavity formed therein;
      an opening in the housing for receiving bulk material from the at least one portable container disposed on the support structure into the mulling device;
      at least one inlet in the housing for introducing one or more additives into the bulk material within the mulling device, wherein the at least one inlet is located beneath the support structure; and
      at least one mulling screw disposed in the cavity of the housing, wherein the at least one mulling screw mixes the one or more additives with the bulk material while transferring the bulk material longitudinally through the cavity;
   a liquid additive pump, wherein the liquid additive pump has a pump outlet, wherein the liquid additive pump pumps one or more additives from the pump outlet through the at least one inlet into the cavity of the mulling device; and
   an outlet disposed at a longitudinal end of the housing where the bulk material combined with the one or more additives is discharged from the mulling device.

2. The system of claim 1, wherein the support structure and the mulling device are integrated into a trailer unit.

3. The system of claim 1, further comprising a blender disposed adjacent to the mulling device, wherein the blender comprises a mixing compartment for mixing additional liquid additives into the bulk material to generate a treatment fluid.

4. The system of claim 3, wherein the support structure and the mulling device are positioned proximate the blender such that the mulling device outputs the bulk material combined with the one or more additives from the outlet directly into the mixing compartment of the blender.

5. The system of claim 1, wherein the support structure comprises a positioning system for receiving and holding the at least one portable container at a specific location on the support structure.

6. The system of claim 1, wherein the support structure comprises a flow regulation mechanism for controlling an amount of bulk material released from the at least one portable container.

7. The system of claim 1, wherein the at least one mulling screw is oriented horizontally.

8. The system of claim 1, wherein the mulling device comprises at least one other inlet in the housing, wherein the at least one other inlet is separate from the at least one inlet in the housing and separate from the opening in the housing, wherein the at least one inlet and the at least one other inlet are disposed at different longitudinal positions along the mulling device for introducing different additives.

9. The system of claim 1, wherein the at least one mulling screw has different patterns of threads or grooves at different longitudinal positions along the mulling device.

10. The system of claim 1, wherein the at least one mulling screw comprises two mulling screws with interlocking threads or grooves formed thereon.

11. The system of claim 1, wherein the mulling device comprises a shrouded section at an outlet end thereof, wherein the shrouded section comprises one of the plurality of side walls of the housing at the outlet end of the mulling device, wherein a dimension of the one of the plurality of side walls is elongated in a direction parallel to an axis of the at least one mulling screw, and wherein the at least one mulling screw extends entirely through the one of the plurality of side walls.

12. The system of claim 1, wherein the opening is in an upper surface of the housing and wherein the at least one inlet is in one of the plurality of side walls of the housing.

13. A method, comprising:
feeding bulk material from one or more portable containers directly into a mulling device disposed beneath a support structure, the one or more portable containers being held on the support structure, wherein the mulling device comprises a housing having at least a plurality of side walls, a bottom, a cavity formed therein, and an opening in the housing for receiving the bulk material into the mulling device;
pumping one or more additives via a liquid additive pump into the cavity of the mulling device, wherein the liquid additive pump has a pump outlet, wherein the one or more additives are pumped from the pump outlet through at least one inlet in the housing to the cavity;
introducing the one or more additives into the bulk material within the mulling device via the at least one inlet in the housing, wherein the at least one inlet is disposed beneath the support structure;
combining the one or more additives with the bulk material via at least one mulling screw of the mulling device, wherein the at least one mulling screw is disposed in the cavity of the housing; and
transferring the bulk material combined with the one or more additives to an outlet of the mulling device disposed at a longitudinal end of the housing via the at least one mulling screw.

14. The method of claim 13, further comprising outputting the bulk material combined with the one or more additives directly from the outlet of the mulling device into a hopper of a blender.

15. The method of claim 13, further comprising outputting the bulk material combined with the one or more additives directly from the outlet of the mulling device into a mixing compartment of a blender.

16. The method of claim 13, further comprising combining the one or more additives with the bulk material via the mulling device to generate a treatment fluid, and outputting the treatment fluid from the outlet of the mulling device directly to a pump.

17. The method of claim 13, wherein the one or more additives comprise at least one additive selected from the group consisting of: a coating substance, a wetting substance, a gelling agent, a diverter, a friction reducer, and a surfactant.

18. The method of claim 13, further comprising:
introducing a first additive into the bulk material via the at least one inlet in the housing;
combining the first additive with the bulk material at a first longitudinal location of the mulling device via the at least one mulling screw;
introducing a second additive into the bulk material via at least one other inlet in the housing, wherein the at least one other inlet is separate from the at least one inlet in the housing and separate from the opening in the housing, and wherein the at least one inlet and the at least one other inlet are disposed at different longitudinal positions along the mulling device; and
combining the second additive with the bulk material at a second longitudinal location of the mulling device via the at least one mulling screw.

19. The method of claim 13, further comprising feeding the bulk material from the one or more portable containers into the mulling device via gravity.

20. The method of claim 13, wherein the one or more additives comprise a resin.

* * * * *